United States Patent [19]

Grabowski

[11] Patent Number: 5,070,959
[45] Date of Patent: Dec. 10, 1991

[54] WORK VEHICLE HAVING AN ELECTRIC PROPULSION SYSTEM WITH ADAPTED OVERSPEED LIMIT FOR TRACTION

[75] Inventor: Francis M. Grabowski, Erie, Pa.
[73] Assignee: General Electric Company, Erie, Pa.
[21] Appl. No.: 438,147
[22] Filed: Nov. 20, 1989
[51] Int. Cl.⁵ .......................... B60K 6/02; B60L 15/20
[52] U.S. Cl. ...................... 180/167; 180/65.4; 180/65.8; 364/426.01
[58] Field of Search ............... 180/65.2, 65.4, 65.5, 180/65.8, 168, 169, 170, 290, 167; 364/426.01; 303/22.2, 100

[56] References Cited

U.S. PATENT DOCUMENTS

| | | | |
|---|---|---|---|
| 4,206,829 | 6/1980 | Melocik | 180/290 |
| 4,402,047 | 8/1983 | Newton et al. | 364/426.01 |
| 4,495,449 | 1/1985 | Black et al. | 318/60 |
| 4,692,867 | 9/1987 | Poole | 364/426.01 |
| 4,780,817 | 10/1988 | Lofgren | 180/168 X |
| 4,911,259 | 3/1990 | Dogahara et al. | 180/170 |
| 4,947,094 | 8/1990 | Dyer et al. | 180/168 X |
| 4,967,860 | 11/1990 | Kremser | 180/169 |

FOREIGN PATENT DOCUMENTS

| | | | |
|---|---|---|---|
| 3523352 | 1/1986 | Fed. Rep. of Germany | 180/170 |
| 0261404 | 10/1988 | Japan | 364/426.01 |
| 0886036 | 11/1981 | U.S.S.R. | 180/170 |

Primary Examiner—Andres Kashnikow
Assistant Examiner—Brian L. Johnson
Attorney, Agent, or Firm—R. Thomas Payne

[57] ABSTRACT

An electrical propulsion system for a traction vehicle adapted to haul a payload, the vehicle being equipped with weight sensing device for distinguishing between loaded and unloaded conditions and with communication device adapted to receive from an external source a coded signal indicative of a given speed limit, the system including electric motors driving a pair of vehicle wheels, a controllable source of electric power for the motors, a device for switching from propulsion to electrical retarding modes of operation in response to the actual speed of the vehicle becoming greater than a desired maximum, and a device connected to the weight sensing device and to the communication device for automatically adjusting the maximum propulsion speed so that it is lower when said loaded condition is true than when said unloaded condition is true and for automatically changing the maximum propulsion speed as necessary to avoid exceeding the limit indicated by the coded signal.

28 Claims, 3 Drawing Sheets

WORK VEHICLE HAVING AN ELECTRIC PROPULSION SYSTEM WITH ADAPTED OVERSPEED LIMIT FOR TRACTION

BACKGROUND OF THE INVENTION

This invention relates generally to electric propulsion systems for traction vehicles and, more particularly, to a method and apparatus for automatically adjusting maximum allowable propulsion speed to enable the vehicle to be operated with optimum productivity.

An electric propulsion system for a traction vehicle, such as a large haulage truck, typically comprises a prime mover-driven electric generating means for supplying electric power to a pair of high-horsepower electric traction motors respectively connected in driving relationship to a pair of wheels on opposite sides of the vehicle. The prime mover is commonly a diesel engine, and the traction motors are generally adjustable speed, reversible direct current (d-c) electric motors. A vehicle operator controls the vehicle speed and direction of travel, i.e., forward or reverse, by manipulation of a speed control pedal and a forward-reverse selector switch. This speed control pedal is adapted to control the engine speed (rpm) which determines the power output of the generating means, thus varying the magnitude of the voltage applied to the traction motors.

Deceleration of a moving vehicle is accomplished by releasing the speed control pedal and either allowing the vehicle to coast or activating its mechanical brakes or electrical retarding system. In the electrical retarding mode of operation (sometimes called electric or dynamic braking), the motors behave as generators, and the magnitude of the voltage generated across the armature windings of each motor is proportional to the rotational speed and the field excitation current of the motor. Dynamic braking resistor grids are connected across the armatures of the respective motors to dissipate the electric power output of the motors during electrical retarding. The average magnitude of current in each resistor grid is a measure of the retarding effort of the associated motor.

It is common to establish a maximum allowable propulsion speed for such vehicles. Conventional practice is to include a preset overspeed limit in the controls of the propulsion system. Several factors affect the selection of the speed limit. It can not be higher than the maximum safe speed for entering any downhill grade of the roadway along which the vehicle will travel. The maximum safe entry speed is the highest constant speed that can be maintained on the downhill grade with electrical retarding in effect. If the actual entry speed were higher than this maximum, the available dynamic retarding effort of the traction motors would be insufficient to keep the vehicle from accelerating (a "runaway" condition). The maximum retarding ability of d-c traction motors depends primarily on the commutation limit of the motors. Above the commutation limit, electrical arcs or sparks can occur, with resulting damage to the motor commutator and brushes. The commutation limit is a function of armature current magnitude multiplied by armature velocity. At high speeds, the current must be kept relatively low in order to avoid such arcing, thereby resulting in lower available dynamic retarding effort. If the available retarding effort were insufficient to slow the vehicle, service brakes could be used. However, at speeds above about five miles per hour service brakes should not be used because of their undesirably rapid wear at such speeds.

The retarding effort required to slow the traction vehicle is a function of the weight of the vehicle, including any payload carried by it, and the slope of the grade on which the vehicle is traveling. Dynamic retarding effort in a d-c motor is essentially the product of armature current and field generated flux. If armature current is regulated to a high magnitude in order to generate sufficient retarding effort to slow a fully loaded vehicle, the speed of the vehicle must be very low to avoid arcing at the commutator and brushes.

Prior attempts to ensure safe operation of a haulage vehicle without risking damage to its traction motors have limited the maximum propulsion speed in accordance with worst possible conditions, i.e., an overspeed limit is set for the steepest downhill grade and heaviest payload that are expected to be encountered by the vehicle in normal operation. In some instances, a manual switch has been placed in the vehicle cab to allow the operator to manually select an overspeed limit for either a loaded or an empty vehicle. Manual systems are generally unsatisfactory since they are subject to human error and forgetfulness. Limiting the overspeed setting to worst case conditions prevents the vehicle from moving at higher speeds that would be both desirable and permissible when the vehicle is empty or traveling on a level roadway, thereby reducing the vehicle's productivity.

SUMMARY OF THE INVENTION

A general objective of the present invention is to provide an improved method and system in an electrically propelled traction vehicle for setting overspeed limits without relying on operator decisions and for optimizing vehicle productivity by adaptively adjusting such limits to accomodate variations in the weight of the vehicle and/or in the grade of the roadway along which the vehicle will travel.

It is a more specific objective of the invention to provide means for automatically selecting, in an electrically propelled traction vehicle, a vehicle overspeed limit that is higher when the vehicle is empty than when the vehicle is hauling a heavy load.

It is another specific objective to provide means for automatically selecting, in an electrically propelled traction vehicle, a vehicle overspeed limit that is higher when the vehicle is traveling on a level section of the roadway than when it is approaching a downhill section.

The invention is useful in an electrical propulsion system of a wheeled vehicle adapted to haul a payload along a roadway having a series of wayside markers respectively located in the vicinity of significant roadway grade changes. The vehicle is equipped with load sensing means for providing a weight feedback value that varies with the weight of the payload. It is also equipped with communication means adapted to receive coded signals from the wayside markers as the vehicle approaches the markers in turn, the signal from each marker being indicative of the slope of the new grade being approached by the vehicle. The propulsion system includes a plurality of adjustable speed electric traction motors mechanically coupled in driving relationship to separate wheels on the vehicle and operative alternatively in a propulsion mode and in an electrical retarding mode, and a controllable source of electric power the output of which is electrically coupled in energizing relationship to the respective motors.

Suitable means are associated with the traction motors to derive a speed feedback value representative of the actual vehicle speed. The propulsion system also includes means for providing a speed reference value that determines the maximum vehicle speed in the propulsion mode, and means responsive to the relationship between the speed feedback and reference values for deenergizing the traction motors and for switching from propulsion to retarding modes of operation in response to the actual speed becoming greater than maximum speed. The invention in one form comprises means connected to both the load sensing means and the communication means on the vehicle and effective in response to receipt of a coded signal for automatically adjusting the aforesaid speed reference value so that the maximum propulsion speed is inversely related to the weight feedback value and to the slope of any new downhill grade being approached by the vehicle. In practice the maximum speed will be decreased or increased as necessary to enable the vehicle to enter each new grade at a speed as close as possible to the maximum safe speed for the particular load and slope, whereby optimum productivity can be obtained.

BRIEF DESCRIPTION OF THE DRAWINGS

For a better understanding of the present invention, reference may be had to the following detailed description taken in conjunction with the accompanying drawings in which.

DETAILED DESCRIPTION OF THE DRAWINGS

Figure 1:
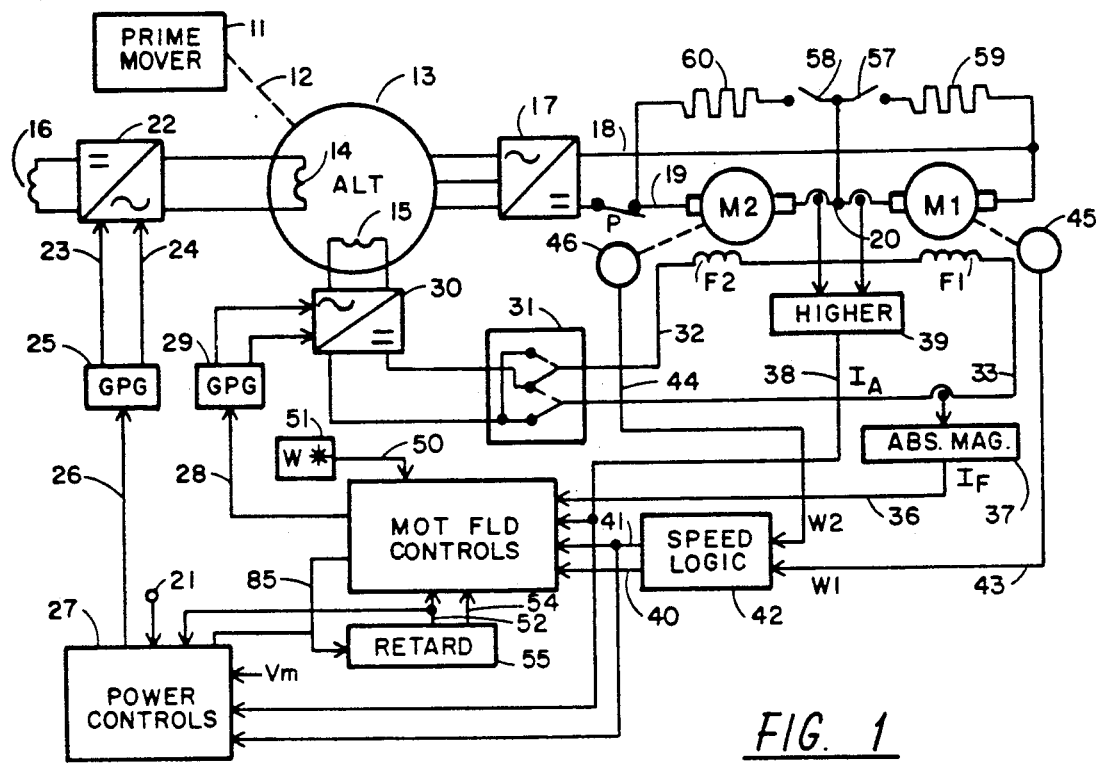
FIG. 1 is a functional block diagram of an exemplary dual motor electric propulsion system for an electric traction vehicle.

The prior art electric propulsion system that is shown in FIG. 1 is intended to be physically located on a self-propelled traction vehicle such as a large off-highway haulage truck. An operator-controlled throttle, e.g., a foot pedal (not shown), is adapted to control the rotational speed (revolutions per minute) of a prime mover 11 which may, for example, be a diesel engine. The output shaft 12 of the engine is drivingly coupled to the rotor of an alternating current (a-c) generator 13, herein referred to as an alternator, which has a set of 3-phase main windings (not shown), a pair of auxiliary (tertiary) windings 14 and 15, and field windings 16. The 3-phase generally sinusoidal alternating voltage that is generated in the main windings of the alternator 13 is converted to direct voltage by means of an uncontrolled full-wave rectifying bridge 17. The prime mover-driven alternator serves as a controllable source of energization for a pair of adjustable speed d-c traction motors M1 and M2 whose respective armature windings are connected, via a contactor P and lines 18, 19 and 20, in series with one another between the output terminals of the rectifying bridge 17. The motors M1 and M2 have separately excited field windings F1 and F2, respectively. The rotors of these motors are respectively coupled in driving relationship, through suitable speed-reduction gearing, to separate wheels (not shown in FIG. 1) on opposite sides of the vehicle. By suitably controlling the speed of the engine 11 and the excitation of the alternator and motor fields, the vehicle can be propelled (also known as "motoring") or dynamically retarded (also known as "electrical retarding") by its motors in either a forward or reverse direction.

During the motoring mode of operation, the motors M1 and M2 will each rotate at a speed that depends on both the magnitude of excitation current in their fields F1, F2 and the magnitude of the voltage applied to their respective armature windings. The latter magnitude is a function of both the speed at which the alternator 13 is driven and the magnitude of excitation current in the alternator field 16. The alternator field excitation current is supplied by the auxiliary winding 14 of the alternator 13 via a single-phase, full-wave "phase controlled" rectifying bridge 22. Its magnitude depends on the timing of periodic firing signals that are supplied to the rectifier 22 over lines 23 and 24 from a conventional gate pulse generator 25 which is connected to an output line 26 of associated power control means 27.

The power control means 27 receives a first input signal representative of the voltage VM at the output of the rectifying bridge 17, a second input signal IA representative of the current in the armature windings of the motors M1 and M2, a third input signal (from a terminal 21) that varies with the rotational speed of the engine 11, and the other inputs shown in FIG. 1. In the motoring mode, this control means is effective to produce on line 26 an output signal having a value normally representative of any magnitude error between a power feedback signal which is proportional to the product of VM and IA and a load reference signal which varies as a function of engine speed. In the event of relatively high magnitudes of VM, IA, or motor speed, an overriding feedback signal proportional to the appropriate one of these parameters is substituted for the power feedback signal, and during the dynamic retarding mode of operation a preselected constant reference signal is substituted for the aforesaid load reference signal. The output signal on line 26 controls the operation of the gate pulse generator 25 and thereby determines the magnitude of current in the field 16. As a result, the alternator field excitation is regulated in a desired manner.

Figure 2:
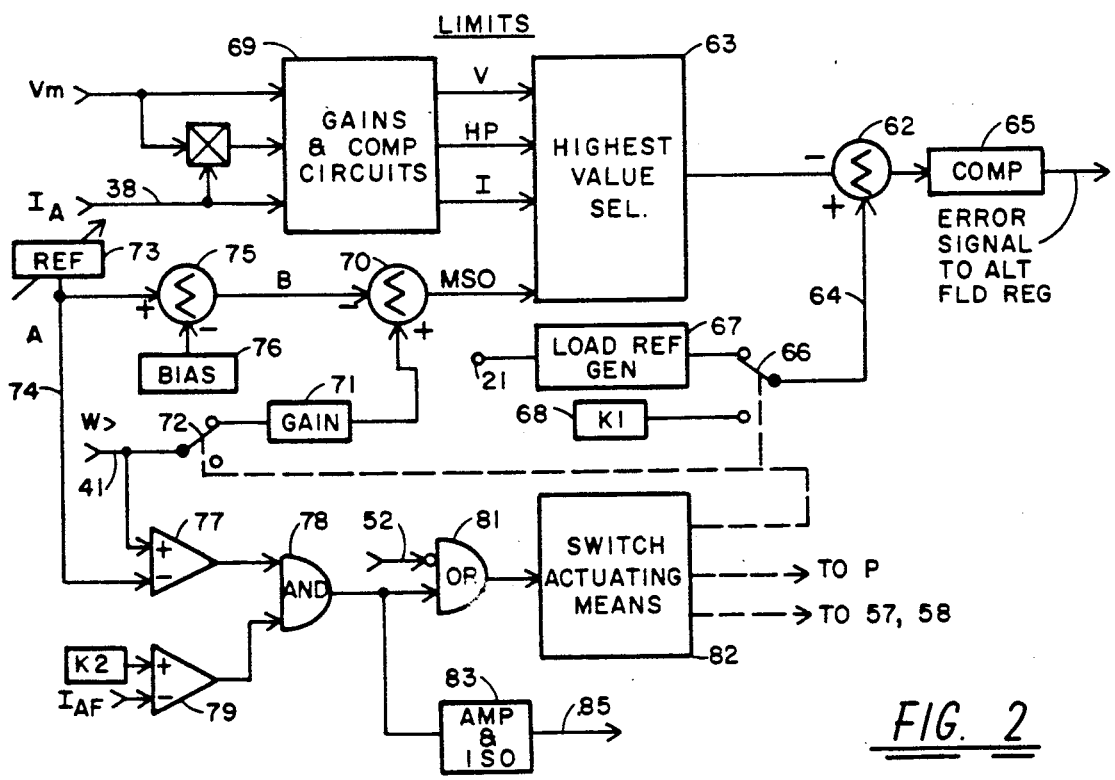
FIG. 2 is a partially schematic and partially block diagram of the power controls shown as a single block in FIG. 1.

Certain parts of the above-summarized power control means 27 are shown in simplified form in FIG. 2, including summing means 62 where a limit value output of a highest positive value selector 63 is subtracted from a load reference value on a line 64. The difference between the summed values is modified as desired by compensation means 65 and serves as an error signal input to the alternator field regulator. If the highest limit value were less than the load reference value on the line 64, the latter regulator (not shown) would increase the electrical output of the main alternator 13 as necessary to minimize the resulting difference. During the motoring mode of operation, the line 64 is connected by bistable switching means 66 to a load reference generator 67 which in turn is connected to the terminal 21 so that the reference value is now determined by the engine speed, whereas during dynamic retarding this line is alternatively connected by the switching means 66 to a source 68 of preselected constant value K1. The highest value selector 63 has four inputs: a voltage limit value V; a current limit value I; a power limit value HP; and a motor speed override limit value MSO. The first three of these inputs are derived from a block 69 representing desired gains and conventional compensation circuits, and they are determined, respectively, by VM, IA, and the product thereof.

Figure 3:
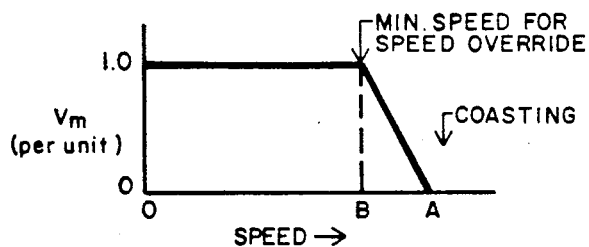
FIG. 3 is a chart that shows how motor voltage would decrease as vehicle speed increases if the speed override function of the FIG. 2 power controls were in effect.

The highest value selector 63 receives its fourth limit value MSO from summing means 70 having first and second inputs respectively representative of the actual motor speed and a set speed "B" that is determined by the desired minimum speed at which MSO will be high enough to influence the error signal value derived by the summing means 62. MSO therefore comprises the algebraic sum of the values of these two inputs. The first input value is proportional to the value of a motor speed feedback signal W> on a line 41. The summing means 70 is coupled to the line 41 via a block 71 which represents a desired gain and a switch 72 which is closed only in the motoring mode. The second input value, which the summing means 70 subtracts from the first input value, corresponds to the set speed B; it is derived from suitable means 73 for providing, on a line 74, an adjustable reference value corresponding to another set speed "A" (generally known as the overspeed set point, i.e., the maximum propulsion speed of the motors that is permissible for safe operation of the vehicle and of the components of its propulsion system). The adjustable value on the line 74 is fed, via a summing point 75 that in effect reduces this value by a relatively small constant amount determined by a bias circuit 76, to the second input of the summing means 70. Typically the bias is selected so that B is approximately two miles per hour lower than A, and a relatively high gain 71 is selected so that the speed override limit MSO will rise to a sufficiently high value, whenever the motor speed has increased to the overspeed set point from the aforesaid minimum speed, to reduce the error signal from the summing means 62 to zero even though the load reference value on the line 64 is at the high end of its engine-speed-determined range of values. This is shown graphically in FIG. 3 where the rectified output voltage VM of the alternator is seen to be ramped down from one per unit to zero as motor speed increases from a minimum speed approximately equal to the set speed B (e.g., 18 mph) to the overspeed set point A (e.g., 20 mph). At the latter speed (A), no voltage is applied to the armature windings of the traction motors M1 and M2, and the vehicle is coasting.

As is illustrated in FIG. 2, the actual motor speed is compared with the overspeed set point A in a conventional bistable comparator 77 the output state of which is determined by the relationship between the values supplied to its respective inputs. This comparator is operative whenever motor speed becomes greater than A (i.e., if and when W> increases above A, or A decreases below W>) to change its output state from low or "0" to high or "1". The output of the comparator 77 is connected as one of two inputs to an AND logic function 78 the second input of which is supplied by another bistable comparator 79. The latter comparator is used to determine whether or not the magnitude of excitation current in the alternator field 16 is less than a relatively low threshold level. It compares a variable feedback value $I_{AF}$, supplied by means (not shown) for sensing the magnitude of alternator field current, with a constant value K2 corresponding to the aforesaid threshold level. If $I_{AF}$ is less than K2, the output state of the comparator 79 is high or "1"; otherwise the output state is low or "0". The AND logic function 78 will have a high or "1" output only when both of its inputs are concurrently high. This output is coupled through an OR logic function 81 to the input of switch actuating means 82 which is suitably constructed and arranged to close or to open preselected switches and contactors, depending on whether the input signal changes from 0 to 1 or from 1 to 0. More particularly, the means 82 will respond to a 0-to-1 transition at its input by actuating the contactor P to its open position so as to disconnect the armature windings of both motors from the alternator 13 (note that at this time VM=0, due to the prior ramp-down action of the speed override limit value MSO as confirmed by $I_{AF}<K2$), by actuating a pair of contactors 57 and 58 to their closed positions and thereby initiating the dynamic retarding mode of operation (as will soon be explained in more detail), and by actuating both of the switches 66 and 72 from their "motoring mode" positions shown in FIG. 2 to their alternative positions. For reasons to be discussed hereinafter, the power control means 27 and separate retard command means 55 are interconnected by two lines 52 and 85. Line 85 is connected to the output of the AND function 78 via a block 83 representing conventional amplifying and isolating means, and line 52 is connected to a "not" input of the OR logic 81 so that the above-summarized operation of the switch actuating means 82 will take place on receipt of a zero-going retard command signal from the means 55 over the line 52.

Returning to FIG. 1, the illustrated propulsion system includes motor field control means (labeled "MOT FLD CONTROLS") for producing an independently variable control signal on an output line 28 which is connected to a conventional gate pulse generator 29. This generator supplies periodic firing signals to another single-phase, full-wave phase controlled rectifying bridge 30 connected between the second auxiliary winding 15 of the alternator 13 and the fields F1 and F2 of the motors M1 and M2. The two motor fields are connected in series with each other to the direct voltage output of the rectifier 30 via lines 32 and 33 and a polarity reversing switch 31. Thus, the auxiliary winding 15, the rectifier 30, and the associated gate pulse generator 29 comprise a separately controllable source of excitation current for the motor fields F1 and F2. This current has a variable average magnitude, and its direction in the motor fields depends on the position of the reversing switch 31. With the switch in its solid-line position, current flows from left to right through the field windings F2 and F1 as viewed in FIG. 1, and the motors rotate in a clockwise direction. On the other hand, with the switch 31 in its broken-line position, current flows from right to left through the field windings and the motors rotate in the opposite or counterclockwise direction.

The average magnitude of excitation current in the series-connected field windings F1 and F2 will depend on the value of the control signal that is supplied to the gate pulse generator 29 over the output line 28 of the motor field control means. The motor field control means receives input signals on seven different lines 36, 38, 40, 41, 50, 52 and 54, respectively. The input on line 36 is a field current signal having a value that varies with the average absolute magnitude (IF) of excitation current in the motor field windings F1 and F2. To derive this signal, the line 36 is coupled to a conventional current transducer in line 33 via suitable means 37 for converting the bipolarity output of the current transducer to a unipolarity voltage signal, on line 36, representative of IF. More particularly, the electric potential on line 36, measured with respect to a predetermined reference potential, e.g., ground, has a magnitude proportional to the number of amperes flowing in line 33, and its polarity does not change regardless of whether the polarity of the transducer output signal is positive or negative with respect to ground.

The signal on the second input line 38 has a value that varies with the average magnitude of motor armature current. To obtain this signal, the line 38 is coupled via a higher magnitude selector 39 to a pair of current transducers which are respectively located in the connections from the line 20 to the motors M1 and M2. These transducers monitor electric currents in the armature windings of the pair of traction motors M1 and M2 that drive the first and second wheels of the vehicle, and they derive feedback signals representative, respectively, of the average magnitudes of such currents. As a result, the signal IA on the line 38 is actually representative of the higher average magnitude of armature current in the two motors.

The signals on the third and fourth input lines 40 and 41 are speed feedback signals representative, respectively, of the actual rotational speeds of the slower motor and of the faster motor. These signals are provided by a speed logic means 42 which in turn is coupled via lines 43 and 44 to a pair of conventional speed sensors 45 and 46 that are respectively associated with the rotors of the two motors M1 and M2. The output of the speed sensor 45 is a signal W1 whose value varies with the angular velocity of the rotor of motor M1, and the output of the speed sensor 46 is a signal W2 whose value varies with the angular velocity of the rotor of motor M2. Since each motor rotor is mechanically coupled in driving relationship to a vehicle wheel, these signals are also representative, respectively, of the rotational speeds of the first and second driven wheels. Preferably, each of the signals W1 and W2 is actually a train of discrete pulses of constant amplitude and duration but having a variable frequency directly proportional to the speed of the associated wheel, which speed can be expressed either as revolutions per unit of time or as linear speed (e.g., miles per hour) at the perimeter of the tire on the wheel. It will now be apparent that the value of the faster motor feedback signal W> on the line 41 is normally representative of the actual speed of the vehicle.

The fifth input line 50 originates at a block 51 which represents suitable means for providing a speed reference signal W* of desired value, as will soon be more fully explained. The sixth and seventh input lines 52 and 54 to the motor field control means originate at the retard command means 55 that produces on line 52 a predetermined command signal when dynamic retarding (electrical retarding) of the vehicle is desired and that provides on line 54 a retarding signal having a value which depends on the degree of dynamic retarding that the operator of the vehicle desires. Preferably the signal on the line 52 is high or "1" during motoring, and it is changed to low or "0" to command retarding. The command signal is produced (i.e., there is a 1-to-0 transition on the line 52) as a result of either the operator depressing the vehicle retard foot pedal (not shown) or, if motor speed increases above the overspeed set point A, the comparator 77 causing a 0-to-1 transition on the line 85 (see FIG. 2). In response to this event, the motor field controls will switch from a motoring mode of operation, wherein the value of the control signal on line 28 is representative of any difference or error between IF and a reference magnitude which varies as a predetermined function of IA, to a retarding mode, wherein the control signal value is representative of any error between IF and a retard reference magnitude which, within limits that are predetermined functions of IA and actual motor speed, is normally determined by the retarding signal on line 54. At the same time, conventional actuating means (not shown in FIG. 1) closes the pair of contactors 57 and 58 in unison, thereby connecting a first braking resistor grid 59 between lines 18 and 20 and concurrently connecting a second braking resistor grid 60 between lines 19 and 20. These resistor grids are used to dissipate the electric power output of the respective motors M1 and M2 which behave as generators during the dynamic retarding mode of operation. The amount of retarding torque exerted by the motors is a function of both the magnitude of IA and the magnitude of IF. In this mode, IA varies with the voltage generated across the armature windings of the motor, and the magnitude of the generated voltage in turn is proportional to motor speed and field excitation. The magnitude of excitation current in the motor field windings depends on the value of the control signal on the output line 28 of the motor field control means; it will increase or decrease as necessary to reduce to zero any error between IF and the retard reference magnitude.

The motor field control means is suitably arranged to incorporate automatic retard speed regulation as disclosed and claimed in U.S. Pat. No. 4,495,449-Black and McElhenny, issued Jan. 22, 1985, and assigned to the assignee of the present invention, which disclosure is expressly incorporated herein by reference. According to Black et al, the retard speed regulator includes means for comparing the feedback signal representing slower motor speed to the manually set speed reference signal W* which has a magnitude corresponding to the motor speed at which retard speed regulation is desired. This feature enables the vehicle to travel on a downhill grade in the retarding mode at a preset, controlled rate, except when retard speed regulation is overridden by a relatively high retarding signal on the line 54 as a result of the operator calling for greater retarding effort. Black et al also teach how the system can be arranged, if desired, to produce the retard command signal on the line 52 in automatic response to the faster motor speed W> increasing above a predetermined speed established by the signal W*.

In accordance with the present invention, the value of the overspeed set point A is changed as a function of the weight of the vehicle and of the slope of any new grade being approached by the vehicle. More particularly, the overspeed set point is automatically adjusted to a level that will enable the vehicle to approach or enter a downhill grade at or near the maximum safe speed for the given load and slope.

Figure 4:
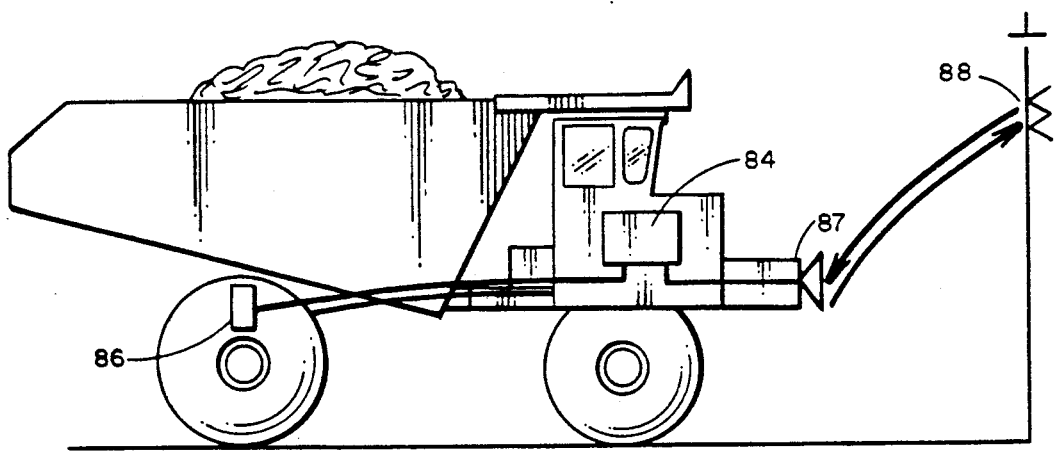
FIG. 4 illustrates a traction vehicle having a propulsion control system that uses the load and grade responsive features of the present invention.

FIG. 4 illustrates a wheeled vehicle utilizing the above-described propulsion system and adapted to haul a payload along a roadway at a variable speed normally determined by the person operating or driving the vehicle. This vehicle is equipped with both weight sensing means 86 responsive to the weight of the payload being hauled by the vehicle and microwave transmitting-receiving means 87 ("transceiver") for obtaining certain information about a grade change that the vehicle is approaching. The respective outputs of the weight sensor 86 and the transceiver 87 are both coupled to suitable data processing means 84 included in the propulsion controls and preferably comprising a microcomputer. The weight sensor 86 can be arranged either to distinguish solely between unloaded and heavily loaded conditions of the vehicle or to provide an indication of the actual weight of the payload. In a preferred embodiment, the grade information is obtained from a series of wayside markers comprising passive transponders or "tags" of a type generally known to persons skilled in the art, which transponders are respectively posted in the vicinity of significant roadway grade changes. One such transponder 88 is shown symbolically in FIG. 4. In response to activating signals received from the transceiver 87 on an approaching vehicle, the transponder 88 will send back or reflect to that transceiver an encoded wave indicative of the percent grade of the next roadway section. The elapsed time between transmitted and reflected waves will provide "ranging" information indicating the distance from the vehicle to the transponder. (The other side of the transponder mount may include another transponder for responding to signals from a vehicle going in the opposite direction so as to indicate a different grade.)

Figure 5:
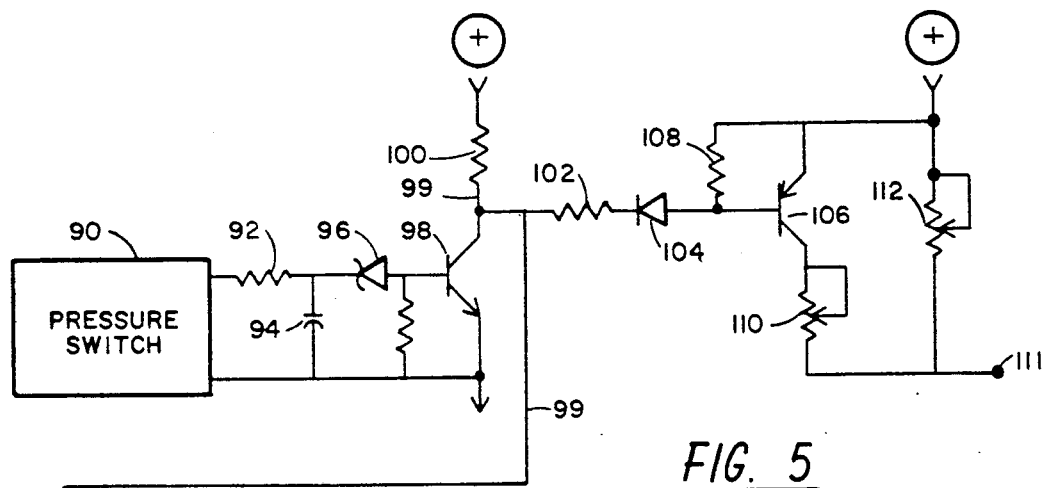
FIGS. 5 and 6 are simplified circuit diagrams of one embodiment of the invention wherein the propulsion control system automatically differentiates between loaded and unloaded conditions of the vehicle.

FIG. 5 is a simplified circuit diagram of one embodiment of the present invention for distinguishing between a loaded and an unloaded vehicle. For this embodiment, the weight sensing means (see reference number 86 in FIG. 4) comprises a hydraulic pressure sensitive switch 90 of a type well known in the art, preferably mounted in the suspension system of the dump body of the vehicle so as to be compressed if the dump body of the vehicle is filled with a heavy payload. The switch 90 produces an electrical output signal that is high (e.g., a relatively positive voltage) if the vehicle is unloaded and low (e.g., at ground potential) when the vehicle is fully loaded. This signal is coupled through an RC filter 92, 94 and a voltage breakover device, illustrated as Zener diode 96, to the base terminal of an NPN transistor switch 98.

The transistor switch 98 includes an emitter terminal connected to ground and a collector terminal connected via a line 99 and a resistor 100 to a relatively positive control power terminal (shown in FIG. 5 as an encircled plus symbol +). So long as the vehicle is fully loaded, the transistor 98 is turned off (i.e., not conducting) and the voltage on the line 99 has a positive polarity and high magnitude. But when the dump body of the vehicle is empty, the pressure switch 90 applies a positive voltage signal to the base of the transistor 98 which is consequently biased to a turned on or conducting state, and the voltage on the line 99 is now reduced to approximately ground potential.

The line 99 is connected through a resistor 102 and a diode 104 to the base of a PNP transistor switch 106. Transistor 106 has an emitter terminal connected through a resistor 108 to its base and also connected directly to the positive control power terminal. The collector terminal of transistor 106 is connected through a rheostat 110 to an output terminal 111. A second rheostat 112 provides a current path in parallel with the transistor 106 between + and the output terminal 111. It will be noted that the net resistance of the parallel paths is a function of whether or not the transistor 106 is conducting. So long as the transistor switch 98 is in its non-conducting state, the high positive voltage on the line 99 is effective to reverse bias the emitter-base junction of the transistor 106 which therefore is also in a turned off or non-conducting state. Now the ohmic magnitude between + and the output terminal 111 will be determined solely by the setting of the rheostat 112. However, if the vehicle were empty so that transistor 98 is turned on, the voltage on the line 99 is reduced to essentially ground potential which biases the transistor 106 to its conducting state, whereby the net resistance of the circuit between + and the output terminal 111 would be decreased by an amount determined by the setting of the slider of the parallel rheostat 110. Thus the circuit automatically distinguishes between loaded and unloaded conditions of the vehicle. It is used in the means 73 (FIG. 2) to adjust the overspeed set point A; the slider of rheostat 112 is set so that A will have the proper magnitude for a heavy vehicle hauling a full load, and the slider of rheostat 110 is set so that A increases to a desired higher level in response to unloading the vehicle. As was mentioned hereinbefore, when the vehicle is empty the maximum safe motor speed is higher than when it is hauling a heavy load, and productivity is improved by automatically changing the overspeed set point as described.

Figure 6:
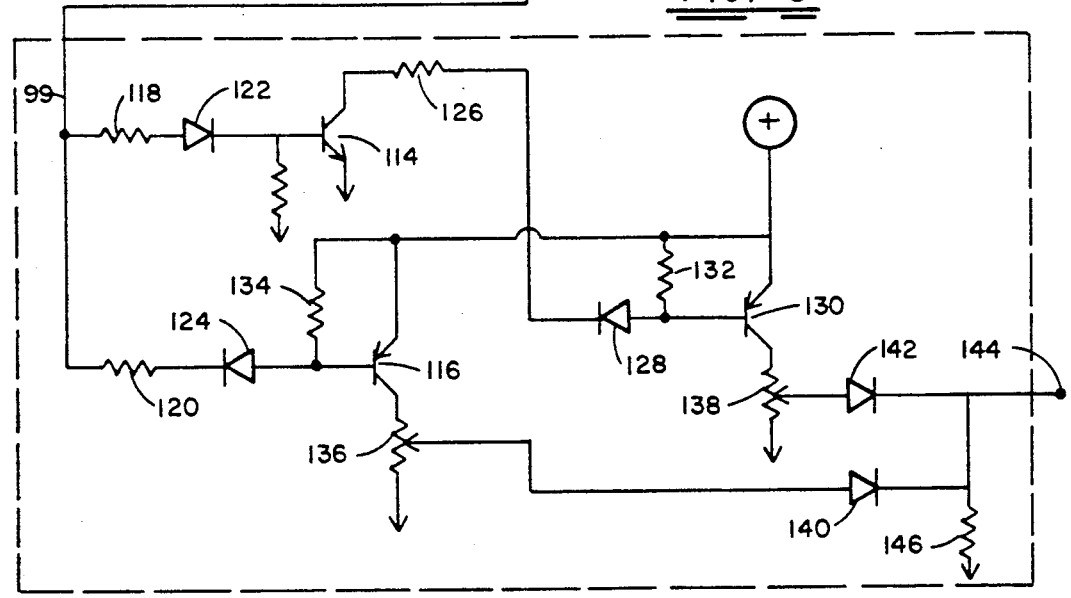

Concurrently with the above-described changes of the overspeed set point A, it is necessary correspondingly to change the minimum speed (B) at which the motor speed override value MSO will begin to cause the rectified alternator voltage VM to ramp down toward zero. In FIG. 2 this result is obtained by subtracting, at a summing point 75, a predetermined bias value from A. FIG. 6 illustrates alternative means for accomplishing the same result. In FIG. 6 the line 99 of FIG. 5 is connected to the base terminals of an NPN transistor switch 114 and a PNP transistor switch 116 via resistors 118 and 120 and diodes 122 and 124, respectively. The transistor 114 is connected in tandem with another PNP transistor switch 130. The collector terminal of the transistor 114 and the base of transistor 130 are interconnected via a load resistor 126 and a diode 128, the emitter terminal of the transistor 114 is connected to ground, and the emitter terminal of the transistor 130 is connected through a resistor 132 to its own base and also connected directly to the positive control power terminal. The emitter terminal of transistor 116 is connected through a resistor 134 to its own base, and it is also connected directly to the positive control power terminal. The collector terminals of the transistors 116 and 130 are connected to ground through potentiometers 136 and 138, respectively. The movable sliders of these potentiometers 136, 138 are respectively connected through diodes 140 and 142 and a common resistor 146 to ground, and an output terminal 144 is provided at the relatively positive voltage end of the resistor 146. In this embodiment of the invention, the voltage magnitude at the output terminal 144 is used to determine the aforesaid second input value to the summing means 70 (FIG. 2), which value corresponds to the speed B at which the speed override limit value MSO will become positive and begin to dominate the output of the power control means 27.

The operation of the FIG. 6 circuit will now be described. Whenever the vehicle is fully loaded, there is a high positive voltage on the line 99. This voltage is effective to reverse bias the emitter-base junction of the PNP transistor 116 which therefore is in a turned off or non-conducting state. The same voltage forward biases the base-emitter junction of the NPN transistor 114 which therefore is turned on. Current conducted by the transistor 114 will forward bias the emitter-base junction of the companion transistor 130 which therefore is also turned on. In summary, when the vehicle is loaded the transistor 116 is turned off and the transistor 130 is turned on. Accordingly, the potentiometer 136 is deenergized, the potentiometer 138 is energized, and the voltage magnitude at the output terminal 144 depends on the position of the slider of the latter potentiometer. In a practical application of the invention, this voltage is so selected that the set speed B will be approximately two mph lower than the full-load magnitude of overspeed set point A.

Alternatively, if the dump body of the vehicle were empty, the voltage on the line 99 would be reduced to essentially ground potential. Now the transistor switches reverse their respective conducting states; the emitter-base junction of the transistor 116 is forward biased and this transistor is turned on, while at the same time both of the tandem transistors 114 and 130 are reverse biased and turned off. As a result, the potentiometer 136 is energized, the potentiometer 138 is deenergized, and the voltage magnitude at the output terminal 144 depends on the position of the slider of the former potentiometer. Typically the slider of the potentiometer 136 is set at a higher level than the slider of the potentiometer 138, whereby the output voltage and hence the set speed B are increased as desired in response to unloading the vehicle.

Figure 7:
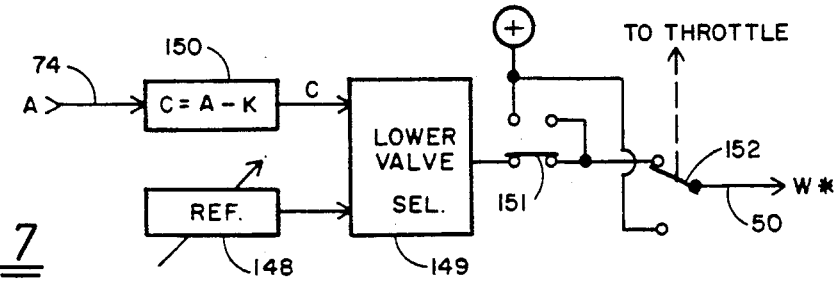
FIG. 7 is a partially schematic and partially block diagram to illustrate how the invention can be used to modify the speed reference signal (W*) during electrical retarding.

It is also desirable to have the speed reference signal W* track the vehicle weight-dependent overspeed set point A. As was previously explained, W* is used to set the the motor speed that the Black et al automatic retard speed regulator will maintain, if and when the traction motors are operating in this mode. FIG. 7 illustrates means for modifying the prior art speed reference signal providing means 51 (FIG. 1) so that W* can track A. In FIG. 7 the block 148 represents suitable means for manually selecting the magnitude of W*, as suggested by Black et al. The output value of this block provides one of two inputs to a conventional lower value selector 149 whose second input is a speed value "C". Suitable means 150 is provided for deriving the latter value from the adjustable overspeed set point A on the line 74 (FIG. 2), whereby C is a desired constant amount lower than A. Alternatively, instead of being connected to line 74 the means 150 could be connected to the line 99 (FIG. 5) and so arranged that the speed value C would equal a first predetermined level if the vehicle were fully loaded or would equal a different, higher predetermined level if the vehicle were empty.

In either case, the selector 149 will select the lower one of its two input values as the speed reference signal W*. The latter signal is fed via a manually operable switch 151, bistable switching means 152, and the line 50 to the motor field controls (FIG. 1). Each of the switches 151 and 152 has an alternative position to that in which it is shown in FIG. 7. If the vehicle operator either manually positions the switch 151 in its other position or depresses the throttle pedal which will actuate the switch 152 to its other position, the line 50 will be disconnected from the selector 149 and connected instead to the positive control power terminal +, whereby W* is raised to a high positive magnitude. Otherwise W* equals C, unless the output of the magnitude selecting means 148 has been set lower than C. The speed value C depends on the weight of the vehicle; it has a higher level when the vehicle is empty than when fully loaded. The higher level will enable the vehicle to travel at a maximum safe speed that is faster without than with a payload while automatic retard speed regulation is effective.

Figure 8:
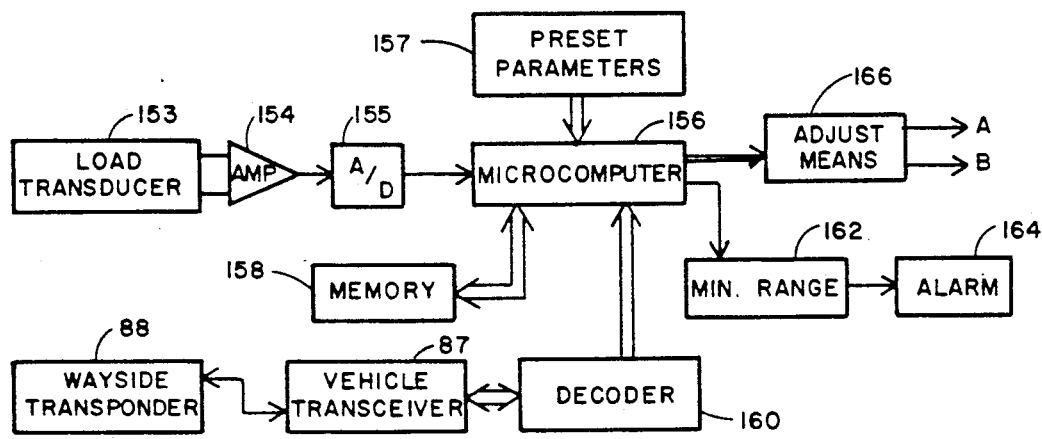
FIG. 8 is a simplified block diagram of an embodiment of the propulsion control system wherein a microcomputer is programmed to execute the functions of the present invention.

In the presently preferred form of the invention, which is illustrated in FIG. 8, the overspeed set point A is varied as a function of both the weight of the vehicle and the slope of any new grade being approached by the vehicle. In this case the weight sensing means (see reference number 86 in FIG. 4) comprises a load transducer 153 mounted in the vehicle's dump body suspension system and suitably arranged to provide an electrical output signal the magnitude of which varies with the weight of the payload in the dump body. This output signal is amplified at 154, and the output of the amplifier 154 is coupled via a conventional analog-to-digital converter 155 to an input port of a microcomputer 156 on board the vehicle. Thus the microcomputer receives from the transducer 153 a weight feedback value that varies with the weight of the vehicle's payload.

The microcomputer 156 corresponds to the data processing means 84 shown in FIG. 4. As is shown symbolically in FIG. 8, suitable means 157 associated with the microcomputer enables certain customizing parameters to be entered. Such parameters relate to known characteristics of the particular vehicle (e.g., tire size, gear ratio, weight of the empty vehicle, characteristic variations of retarding effort with speed during electrical retarding) and of the particular environment in which the vehicle is used (e.g., maximum speed limit). The preset parameters, along with at least one predetermined look-up table (to be described below), are stored in the microcomputer's memory 158. The microcomputer is programmed to calculate the actual gross vehicle weight (GVW) by adding the payload weight, as indicated by the weight feedback value from the load transducer 153, to the empty vehicle weight, as stored in the memory 158.

As was pointed out above, the vehicle shown in FIG. 4 is equipped with a transceiver 87 that communicates with external transponders to provide information regarding the next significant grade change that will be traversed by the vehicle. One such transponder 88 is illustrated in FIG. 8. It is located along the side of the roadway at a predetermined distance "D" from a grade change. The transponder 88 is interrogated by the microwave signal that is continuously transmitted at a predetermined frequency by the transceiver 87. Once the vehicle is within a transponder's field of view (e.g., ±22.5° both horizontally and vertically from a position that is normal with respect to the center of the transponder's face) and is close enough to the transponder to be within communication range (e.g., approximately 150 feet maximum), there is sufficient energy in the interrogating signal to enable the transponder to send back to the transceiver a reflected signal suitably encoded to indicate the percent slope ("%") of the new grade. (If desired, the reflected signal could also be encoded to indicate the distance D.) The time lapse between transmitting a microwave and receiving the reflected wave is a measure of the range or distance "X" between the transceiver on the vehicle and the object reflecting the wave, which object can be either the slope indicating transponder or another wayside marker located adjacent thereto. All of this data is passed through a decoder 160 and supplied to the microcomputer 156 which is programmed to process the same in the manner summarized below. If X were less than a predetermined minimum distance (e.g., 10 feet), the vehicle would be too close to the transponder 88 to ensure that the range information from the transceiver 87 is accurate and reliable, and to mark this event a minimum range function 162 in the microcomputer activates an alarm 164. Once activated, the alarm 164 will remain activated for at least a predetermined short interval of time.

The data representing the slope (%) of the new grade and the gross vehicle weight (GVW) are utilized by the microcomputer 156 to modify the overspeed set point A of the vehicle propulsion system so that the maximum safe speed of the vehicle as it enters the new grade will be optimized. Preferably this is done by loading in the memory 158 a look-up table containing the addresses of predetermined values that correspond to desired levels of A for various combinations of % and GVW. The more gentle the slope of a downhill grade, the higher the desired set point A. The lighter the vehicle payload, the higher the desired set point A. For each different combination of discrete values (or values within discrete ranges) of % and GVW, the microcomputer finds a designated address in this look-up table and automatically supplies the value stored at that address to suitable means 166 for correspondingly adjusting the set point A. In this manner the microcomputer is effective to establish a maximum propulsion speed that is inversely related to both the gross vehicle weight and the slope of any new downhill grade being approached by the vehicle.

Concurrently with any adjustment of the overspeed set point A, there is a corresponding change of the minimum speed B at which the above-described speed override feature becomes effective. This can be accomplished either by including in the means 166 a tracking function, or by providing in the memory 158 a second look-up table containing the addresses of desired values of B for different combinations of % and GVW. The power control means 27 of the vehicle propulsion system (see FIGS. 1 and 2) automatically responds to any reductions in A and B as follows: if the new setting of B is lower than actual speed W>, the motor speed override limit MSO becomes effective to reduce the alternator field excitation and the voltage VM; if the new value of the overspeed set point A is below W>, the comparators 77 and 79 are effective, as soon as the speed override feature has reduced VM to substantially zero (as indicated by alternator field current decreasing below the low threshold level [K2]), to activate the switch actuating means 82. In immediate and automatic response to the latter event, the contactor P disconnects the line 19 from the rectifying bridge 17, thereby completely deenergizing the traction motors. At the same time, the contactors 57, 58 are closed to connect the dynamic braking resistor grids 59, 60 across the motor armature windings, the retard command means 55 is activated via the line 85, and the load reference value line 64 is connected to the constant value source 68, thereby switching the mode of operation from propulsion to electrical retarding as previously described. Now the traction motors exert maximum retarding effort, and the vehicle will decelerate until W> no longer exceeds the new value of A.

Preferably the microcomputer 156 is so programmed that if the vehicle were approaching a downhill grade at a speed faster than the maximum safe speed for that particular grade, as soon as the vehicle is an appropriate distance "Y" from the brink of that grade its overspeed set point A is changed to a lower level so that the vehicle can decelerate to the new overspeed limit before actually reaching the grade change. In other words, A is reduced at a sufficient distance in advance of the grade change to allow the dynamic retarding action to slow the vehicle to a safe speed for descending the downhill grade. The reduction can be either in a single step or in a series of two or more smaller steps. In either case, the actual speed and weight of the vehicle and the new overspeed set point are known, and the actual distance between the grade change and the approaching vehicle is calculated by adding the measured ranging distance X to the distance D from the transponder 88 to the grade change. (D could be stored in the computer memory 158 if it were relatively constant for all grade changes along the roadway; alternatively, it could be specially encoded in the reflected signal from each wayside transponder.) From this data the microcomputer determines the distance Y at which the overspeed set point A should be reduced, taking into account the inherent time delay (e.g., approximately one second) required to complete the steps of ramping down the alternator voltage VM to zero, opening the contactor P, and closing the contactors 57 and 58 once these steps are initiated. The set point adjusting means 166 is not activated unless the actual distance is equal to or less than Y.

To further illustrate the invention, an example of how the distance Y is determined will now be set forth. In this example, the following parameters are assumed or otherwise determinable:

480,000-pound payload in dump body of the vehicle;

$GVW = 830,000$ pounds; $M = GVW/g = 25,776$ lbs-sec$^2$/ft;

vehicle traveling on level roadway at speed of 30 mph;

approaching a downhill grade of 8%;

forward force of vehicle on 8% slope=66,400 lbs. ($=0.08GVW$);

maximum constant speed that can be held by dynamic retarding action while descending 8% slope=18.6 mph (as found from given retarding-effort vs. speed Curve of electrical retarding characteristic for this particular vehicle, at a point on the Curve where retarding force equals forward force);

maximum safe speed at this GVW and grade is less than 18.6—therefore the overspeed set point look-up table is loaded with the address of a value corresponding to 16 mph;

retarding force "F1" at 30 mph=27,000 lbs (from Curve); retarding force "F2" at 16 mph=86,000 lbs (from Curve).

From this data the microcomputer 156 estimates the time that will be required for the vehicle to decelerate, in the electrical retarding mode with maximum retarding effort, from 30 to 16 mph, and the distance it will travel during this time. A typical process for estimating the latter distance is outlined in the following paragraph.

The average speed of the vehicle as it decelerates from its present speed of 30 mph to the new speed of 16 mph will be $(30+16) \div 2 = 23$ mph, or 33.7 ft/sec. Using the well known equation F (force) equals M (mass) times acceleration, the initial deceleration $F1/M = 1.05$ ft/sec.$^2$ and the final deceleration $F2/M = 3.33$ ft/sec.$^2$ are calculated and averaged. At an average deceleration of 2.19 ft/sec.$^2$, the vehicle will slow down from 30 mph (or 44 ft/sec.) to 16 mph (or 23.5 ft/sec.) in a time "t" equal to the difference between these two speeds divided by the average deceleration, or 9.36 sec. The distance traveled during this time is the product of t and the average speed of 33.7 ft/sec., namely 315 feet. Another 44 feet are traversed by the vehicle when traveling at 30 mph during the one second required to set up electrical retarding. Therefore Y is set at 360 feet or more. In this example, the transponder could be located 250 feet from the grade change, and the set point adjusting means 166 could be activated to reduce the overspeed set point to 16 mph whenever the actual distance X between the wayside transponder and the approaching vehicle decreases to 110 feet.

If the maximum communication range of the microwave transceiver were great enough to permit, a margin of safety could be provided by programming the microcomputer so that Y is large enough to enable the vehicle to attain the new, lower maximum safe speed before it reaches the position of the wayside transponder and so that the vehicle operator will be warned to use the retard foot pedal in the event actual speed exceeds the new maximum when the minimum range alarm 164 is activated. In the event of such warning, there will be time for further deceleration as the vehicle travels the distance D from the transponder to the brink of the down grade. As a further variation of the invention, D is varied with the slope of the new grade, whereby the steeper the grade the greater the available distance for retarding the vehicle before entering the grade.

The wayside transponders are located not only in the vicinity of significant roadway grade changes, but also in the vicinity of crossroads. As a fast moving vehicle comes within communication range of a crossroad transponder, its overspeed set point A and minimum override speed B will be subject to automatic reductions in the same manner as described above for a downhill grade approach, thereby ensuring that the maximum speed will not exceed whatever speed limit is prescribed for unloaded vehicles entering that particular intersection. The resulting deceleration will give the operator more time to look for vehicles approaching on the side road, thereby avoiding accidents that could occur if two vehicles were to enter the intersection at the same time.

Figure 9:
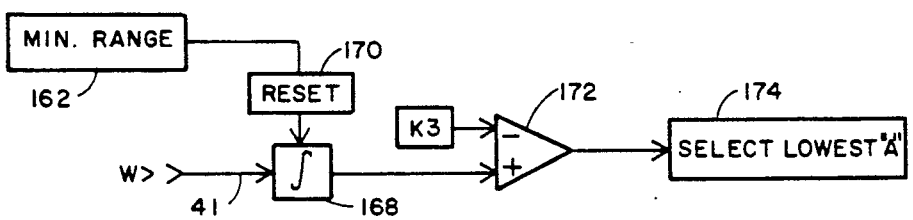
FIG. 9 is a schematic diagram illustrating the manner in which the FIG. 8 microcomputer can be programmed to implement a "fail safe" feature of the invention.

In another aspect of the invention, a "fail safe" feature is provided by so programming the microcomputer 156 that the overspeed set point A is automatically set at the lowest value in the look-up table in response to the vehicle traveling a predetermined distance without encountering a reflected microwave signal from a wayside transponder. This feature is illustrated schematically in FIG. 9. The actual distance traveled is the time integral of the speed W> and is simply measured by integrating means 168. Each time the vehicle is in relatively close proximity to a wayside transponder, the minimum range function 162 will cause reset means 170 to reset the integrator 168, thereby automatically recycling the distance feedback value at the output of this integrator to its quiescent value (e.g., zero). If and when the distance feedback value exceeds a predetermined level K3, a comparator 172 activates means 174 for selecting the lowest overspeed set point A. K3 corresponds approximately to the length of the longest level section of roadway between two consecutive wayside transponders that the vehicle will pass in service. This distance will depend on the application; in a typical iron ore mine it could be 1,500 feet, whereas in a typical coal mine it could be one-tenth as long. It will now be apparent that this fail-safe feature ensures a relatively low overspeed set point in the abnormal event that one of the wayside transponders is damaged or missing.

What has been described is a traction vehicle propulsion system comprising a pair of adjustable speed electric motors that can propel or retard the wheels of the vehicle. The system includes apparatus responsive to a speed reference value for establishing a maximum propulsion speed or overspeed limit of the vehicle. In accordance with the present invention, weight sensing means is mounted on the vehicle for providing a feedback signal that is a measure of the weight of the vehicle's payload, and means responsive to this signal is provided for adjusting the speed reference value so that the overspeed limit is inversely related to gross vehicle weight. In one form, the weight feedback signal is provided by a pressure switch mounted in the vehicle suspension; it has a first logical significance when the vehicle is loaded and a second logical significance when the vehicle is unloaded. In another embodiment, the weight sensor provides a feedback signal having a value that varies with the weight of the payload.

The invention also includes transmitter/receiver means mounted on the vehicle for communicating with wayside markers so as to trigger certain automatic changes in the overspeed limit of the vehicle. Such markers are located in the vicinity of grade changes and intersections in the roadway. Preferably the communication link is constructed and arranged to obtain data that is coded to indicate the slope of the next roadway section being approached by the vehicle, and means responsive to this data is provided for adjusting the speed reference value so that the overspeed limit has an inverse relationship to the new slope. In a preferred form, the invention has been described as being implemented in a microcomputer having a memory for storing a plurality of digital representations of speed reference values, the microcomputer being operative to select an appropriate value for the sensed weight and new slope and to apply the selected value at an appropriate point in advance of any new, steeper down grade to allow sufficient time for the vehicle to slow down from its present speed to the new overspeed limit before entering the new grade. By thus adapting the overspeed limit to weight variations of the vehicle and slope variations of the roadway, the vehicle can be operated at the highest possible speed consistent with safety. The overspeed limit is relatively high so long as the vehicle is unloaded and traveling on a level road. It is automatically reduced whenever the vehicle is carrying a heavy payload. It is also automatically reduced if and when necessary to prevent the vehicle from traversing an intersection too fast or from entering a downhill grade at a speed in excess of the maximum safe speed for that particular load and slope. Consequently the productivity of the vehicle is optimized without risking "runaway" on downhill grades. A runaway condition could result if the vehicle speed were so high that the available retarding force in electrical retarding is less than the forward gravitational force of the vehicle.

While the present invention has been described in what is considered to be a preferred embodiment, it is intended that it not be limited by the disclosed implementation but be interpreted within the full spirit and scope of the appended claims.

I claim:

1. An electrical propulsion system for a wheeled vehicle adapted to haul a payload along a roadway at a variable speed, the vehicle being equipped with weight sensing means for distinguishing between a loaded condition and an unloaded condition, the system comprising:

a plurality of adjustable speed electric traction motors mechanically coupled in driving relationship to separate wheels on the vehicle and operative alternatively in a propulsion mode and in an electrical retarding mode;

means associated with the motors for deriving a speed feedback value representative of the actual vehicle speed;

a controllable source of electric power the output of which is electrically coupled in energizing relationship to the respective motors;

means for providing a speed reference value that determines a maximum vehicle speed in the propulsion mode;

means responsive to the relationship between the speed feedback and reference values for deenergizing the traction motors and for switching from propulsion to retarding modes of operation in response to the actual speed becoming greater than the maximum speed;

means, operatively connected to the weight sensing means, for automatically adjusting the speed reference value so that the maximum propulsion speed is lower when the loaded condition is sensed than when the unloaded condition is sensed;

and communication means for receiving from an external source a coded signal indicative of a desired speed limit whereby the reference value adjusting means is activated to automatically change the reference value so that the maximum speed will not exceed the desired speed limit.

2. The system of claim 1 further comprising:

means for controlling the electric power source including a speed override means for reducing energization of the traction motors in the propulsion mode if the vehicle speed exceeds a minimum speed which is lower than the maximum speed, wherein the reference value adjusting means is effective automatically to set the minimum speed at a lower level when the vehicle is loaded than when the vehicle is unloaded.

3. An electrical propulsion system for a wheeled vehicle for hauling a payload along a roadway at variable speeds, the vehicle being equipped with communication means for receiving a coded signal indicative of a desired speed limit from a passive reflecting means, the system comprising:

at least two adjustable speed electric traction motors operatively connected to separate wheels on the vehicle for selectively propelling or retarding wheel rotation, means associated with the motors for deriving a speed feedback value representative of the actual vehicle speed, a controllable source of electric power operatively connected in energizing relationship with the respective motors, means for providing a speed reference value that determines a maximum vehicle speed in the propulsion mode, means responsive to a relationship between the speed feedback value and the reference value for deenergizing the traction motors and for switching from propelling to retarding wheel rotation in response to the actual speed becoming greater than the maximum speed, means operatively connected to the communication means for automatically adjusting the speed reference value so that the maximum speed will not exceed the desired speed limit, means for controlling the power source and having a speed override means for reducing energization of the traction motors in the propulsion mode if the vehicle speed exceeds a minimum speed which is lower than the maximum speed, wherein the reference value adjusting means is effective in response to receipt of a coded signal by the communication means for automatically changing the setting of the minimum speed so that the minimum speed is inversely related to the slope of any new feature being approached by the vehicle.

4. A method for adjusting the maximum propulsion speed of a wheeled vehicle of a type having a dump body adapted to haul a payload, weight sensing means for distinguishing between a loaded condition and an unloaded condition, a plurality of adjustable speed electric traction motors mechanically coupled in driving relationship to separate wheels on the vehicle and operative alternatively in a variable speed propulsion mode and in an electrical retarding mode, means associated with the motors for deriving a speed feedback value representative of the actual vehicle speed, a controllable source of electric power the output of which is electrically coupled in energizing relationship to the respective motors, means for providing a speed reference value that determines a maximum vehicle speed in the propulsion mode, means responsive to the relationship between the speed feedback and reference values for deenergizing the traction motors and for switching from propulsion to retarding modes of operation in response to the actual speed becoming greater than the maximum speed, and means for controlling the power source so that energization of the traction motors in the propulsion mode is reduced if the vehicle speed exceeds a minimum speed which is less than the maximum speed, comprising the steps of:

automatically adjusting the speed reference value so that the maximum propulsion speed is lower when the vehicle is loaded then when the vehicle is unloaded; and automatically setting the minimum speed at a lower speed when the vehicle is loaded than when the vehicle is unloaded.

5. The method of claim 4 wherein the vehicle has communication means adapted to receive from an external source a coded signal indicative of a desired speed limit, the method further comprising the step of:

when the communication means is receiving the coded signal, automatically changing the reference value to ensure that the maximum propulsion speed will not exceed the limit.

6. An electrical propulsion system for a wheeled vehicle hauling a payload along a roadway at variable speeds, the vehicle having weight sensing means for distinguishing between a loaded condition and an unloaded condition, the system comprising:
- a plurality of adjustable speed electric traction motors operatively connected to separate wheels on the vehicle and operative alternatively in a propulsion mode and in an electrical retarding mode;
- means associated with the motors for deriving a speed feedback value representative of actual vehicle speed;
- a controllable source of electric power, operatively connected to the traction motor, for electrically energizing the respective motors;
- means for providing a speed reference value for determining a maximum vehicle speed in the propulsion mode;
- means, responsive to the relationship between the speed feedback value and the reference value, for deenergizing the traction motors and for switching from propulsion to retarding modes of operation in response to the actual speed becoming greater than the maximum speed;
- means, operatively connected to the weight sensing means, for automatically adjusting the speed reference value so that the maximum propulsion speed is lower when the loaded condition is sensed than when the unloaded condition is sensed; and
- means for controlling the electric power source which includes a speed ovedrride means for reducing energization of the traction motors in the propulsion mode if the vehicle speed exceeds a minimum speed which is lower than the maximum speed, wherein the reference value adjusting means automatically sets the minimum speed at a lower level when the load condition is sensed than when the unloaded condition is sensed.

7. The system of claim 6 wherein the speed override means will cause motor energization to be reduced to zero as vehicle speed increases from the minimum speed to the maximum speed.

8. The system of claim 6 wherein the weight sensing means provides a weight feedback value which varies with the payload weight, so that the reference value adjusting means is responsive to the weight feedback value to increase the minimum speed as the weight feedback value decreases.

9. The system of claim 8 wherein the minimum speed is a function of the maximum speed.

10. An electric propulsion system for a wheeled vehicle for hauling a payload along a roadway having a series of passive wayside markers respectfully located in the vicinity of significant roadway grade changes, the vehicle being equipped with communications means for receiving coded signals from the wayside markers as the vehicle approaches the markers in turn, the signal from each marker being indicative of the slope of the new grade being approached by the vehicle, the system comprising:
- a plurality of adjustable speed electric traction motors mechanically coupled in driving relationship to separate wheels on the vehicle and operative alternatively in a propulsion mode and in an electrical retarding mode,
- means associated with the motors for deriving a speed feedback value representative of the actual vehicle speed,
- a controllable source of electric power, the output of which is electrically coupled in an energizing relationship to the respective motors;
- means for providing a speed reference value that determines a maximum vehicle speed in the propulsion mode;
- means responsive to the relationship between the speed feedback and the reference values for deenergizing the traction motors and for switching from propulsion to retarding modes of operation in response to the actual speed becoming greater than the maximum speed;
- means connected to the communication means on the vehicle and effective to a response to receipt of a coded signal for automatically adjusting the speed reference value so that the maximum propulsion speed is inversely related to the slope of any new downhill grade being approached by the vehicle; and
- means for controlling the power source including a speed override means for reducing energization of the traction motors in the propulsion mode if the vehicle speed exceeds a minimum speed which is lower than the maximum speed, wherein the reference value adjusting means is effective in response to receipt of a coded signal by the communication means for automatically changing the setting of the minimum speed so that the minimum speed is inversely related to the slope of any new downhill grade being approached by the vehicle.

11. The propulsion system of claim 10 further comprising:
- means responsive to the speed feedback value for deriving a distance feedback value that increases with the distance the vehicle travels, means responsive to the coded signals for resetting the distance feedback value whenever the vehicle is in relatively close proximity to a wayside marker, and means, if the distance feedback value exceeds a predetermined level, for ensuring that the speed reference value is relatively low.

12. The propulsion system of claim 10 wherein the weight feedback value varies with the weight of the vehicle's payload, and the reference value adjusting means is effective to increase the maximum speed as the weight feedback value decreases.

13. The propulsion system of claim 12, further comprising:
- means, associated with the communication means, for detecting the actual distance between the marker and the vehicle;
- means, responsive to the weight feedback value, to the slope indicated by the coded signal, and to a given retarding-effort versus a speed characteristic of the vehicle, for determining a desired maximum speed at which the vehicle can safely traverse the terrain feature; and
- means responsive to the present vehicle speed as represented by the speed feedback value, to the desired maximum speed, and to the given characteristic for estimating the distance that the vehicle will travel while decelerating in the electrical retarding mode from its present speed to the desired maximum speed wherein the reference value adjusting means changes the maximum propulsion speed to the desired maximum speed whenever the actual distance decreases to a certain number determined by the estimated distance, whereby the actual speed of the vehicle upon entering the terrain feature will not exceed the desired maximum speed.

14. The propulsion system of claim 13 wherein the reference value adjusting means comprises:
a microcomputer having memory means for storing a plurality of different speed reference values respectively corresponding to the maximum speeds that are desired for various possible combinations of payload weights and roadway, terrain features and for selecting the particular stored value that is designated for the actual combination of weight, as measured by the weight sensing means, and terrain features as indicated by the coded signal received by the communication means.

15. An electrical propulsion system for a payload hauling wheeled vehicle operating over terrain having a plurality of different terrain features, the electric propulsion system comprising:
means, operatively connected to the vehicle, for sensing the vehicle payload weight;
at least two adjustable speed electric traction motors, operatively connected to a respective wheel, for selectively operating in a propulsion mode and in an electric retardation mode;
means, operatively connected to the motors, for developing a speed feedback value representative of actual vehicle speed;
a controllable source of electric power operatively connected to each motor;
means for providing a speed reference value which determine a maximum vehicle speed wherein the propulsion mode, and for switching from propulsion to retarding mode in response to actual vehicle speed becoming greater than a maximum vehicle speed; and
processing means, operatively connected to the weight sensing means, for automatically adjusting the speed feedback value as a function of the sensed weight and the terrain features being approached by the vehicle.

16. The electrical propulsion system of claim 15 wherein the speed reference value is automatically adjusted to a value that enables the vehicle to approach a terrain feature at approximately the maximum safe speed for the sensed load and sensed terrain feature.

17. The electrical propulsion system of claim 16 wherein the terrain feature includes a slope of a grade.

18. The electrical propulsion system of claim 17 further comprising:
passive reflective means, operatively positioned on the terrain, for indicating specific terrain features;
means, operatively positioned on the vehicle and operatively connected to the speed reference value adjusting means, for providing terrain data to the processing means.

19. A propulsion system for powering a payload hauling vehicle having wheels, the vehicle being operated at a variable speed determined by an operator over terrain having variable features, the system comprising:
weight sensing means, operatively attached to the vehicle, for sensing the relative vehicle payload weight;
transmitter-receiver means, operatively attached to the vehicle, for obtaining certain terrain feature information from any one of a plurality of coded transponder means;
data processing means, operatively connected to both the weight sensing means and the transmitter-receiver means, for establishing an overspeed set point so that when the vehicle is empty, a predetermined maximum safe vehicle speed is greater than when the vehicle payload weight is heavier; and
means for automatically adjusting the overspeed set point as a function of sensed vehicle weight and sensed terrain features so that the maximum safe speed of the vehicle as the vehicle begins to traverse a certain terrain feature is optimized for vehicle efficiency.

20. The system of claim 19, further comprising:
means for automatically adjusting the overspeed set point to a predetermined lowest value if the vehicle travels a predetermined distance before receiving new terrain feature information.

21. The system of claim 20, wherein the predetermined distance is approximately 1500 feet.

22. The system of claim 20, wherein the predetermined distance is approximately 150 feet.

23. A work vehicle having wheels for hauling payloads, the vehicle comprising:
an internal combustion engine;
electric generating means operatively connected to the engine;
electric traction motor means, operatively connected to at least two vehicle wheels and to the electric generating means, for powering the vehicle;
vehicle control means, operatively connected to the traction motors, for regulating vehicle speed and direction of travel;
weight sensing means, operatively connected to the vehicle, for sensing the weight of any one of a plurality of possible payloads;
transmitter-receiver means, operatively connected to the vehicle, for obtaining terrain feature information from any one of a plurality of coded transponder means operatively positioned along the direction of travel;
data processing means, operatively connected to the weight sensing means, the transmitter-receiver means, and the electric traction motors, for establishing an overspeed set point so that as the vehicle begins to traverse a specific one of a plurality of terrain features, a maximum safe speed for the vehicle is maintained for optimizing vehicle efficiency.

24. An electrical propulsion system for a wheeled vehicle adapted to haul a payload along a roadway at a variable speed, the vehicle being equipped with weight sensing mean for distinguishing between a loaded condition and an unloaded condition, the system comprising:
a plurality of adjustable speed electric traction motors mechanically coupled in driving relationship to separate wheels on the vehicle and operative alternatively in a propulsion mode and in an electrical retarding mode;
means associated with the motors for deriving a speed feedback value representative of the actual vehicle speed;
a controllable source of electric power the output of which is electrically coupled in energizing relationship to the respective motors;
means for providing a speed reference value that determines a maximum vehicle speed in the propulsion mode;
means responsive to the relationship between the speed feedback and reference values for deenergizing the traction motors and for switching from propulsion to retarding modes of operation in response to the actual speed becoming greater than the maximum speed;

means connected to the weight sensing means on the vehicle for automatically adjusting the speed reference value so that the maximum propulsion speed is lower when the vehicle is loaded than when the vehicle is unloaded; and means for controlling the electric power source including a speed override means for reducing energization of the traction motors in the propulsion mode if the vehicle speed exceeds a minimum speed which is lower than the maximum speed, wherein the reference value adjusting means is effective automatically to set the minimum speed at a lower level when the vehicle is loaded than when the vehicle is unloaded.

25. The system of claim 24 wherein the weight sensing means provides a weight feedback value which varies with the payload weight, the speed reference value adjusting means is responsive to the weight feedback value to increase the maximum speed as the weight feedback value decreases.

26. The system of claim 25 wherein the automatically adjusting means is also responsive to the unloaded weight of the vehicle and is effective to establish the maximum speed inversely related to the gross vehicle weight.

27. The system of claim 25 wherein the weight sensing means further comprises:
a load transducer, operatively connected to the vehicle suspension, for providing a signal having a magnitude proportional to the weight of the payload.

28. An electrical propulsion system for a wheeled vehicle for hauling a payload along a roadway at variable speeds, the vehicle being equipped with communication means for receiving a coded signal indicative of a desired speed limit from a passive reflecting means, the system comprising:

a plurality of adjustable speed electric traction motors operatively connected to separate wheels on the vehicle for selectively propelling or retarding wheel rotation, means associated with the motors for deriving a speed feedback value representative of the actual vehicle speed;

a controllable source of electric power operatively connected in energizing relationship with the respective motors;

means for providing a speed reference value that determines a maximum vehicle speed in the propulsion mode;

means responsive to a relationship between the speed feedback value and the reference value for deenergizing the traction motors and for switching from propelling to retarding wheel rotation in response to the actual speed becoming greater than the maximum speed;

means operatively connected to the communication means for automatically adjusting the speed reference value so that the maximum speed will not exceed the desired speed limit; and means for controlling the power source and having a speed override means for reducing energization of the traction motors in the propulsion mode if the vehicle speed exceeds a minimum speed which is lower than the maximum speed, wherein the reference value adjusting means is effective in response to receipt of a coded signal by the communication means for automatically changing the setting of the minimum speed so that the minimum speed is inversely related to the slope of any new feature being approached by the vehicle.

* * * * *